Feb. 26, 1946. B. SVIRSKY Re. 22,727

ANTISIPHONING REFILL TUBE

Original Filed Feb. 16, 1942

INVENTOR,
BENNETT SVIRSKY.

BY

ATTORNEY.

Reissued Feb. 26, 1946

Re. 22,727

UNITED STATES PATENT OFFICE 22,727

ANTISIPHONING REFILL TUBE

Bennett Svirsky, Glendale, Calif.

Original No. 2,302,274, dated November 17, 1942, Serial No. 446,726, June 12, 1942, which is a division of Serial No. 431,017, February 16, 1942. Application for reissue July 14, 1943, Serial No. 494,717

5 Claims. (Cl. 137—111)

This invention relates to an anti-siphoning refill tube.

This application is a division of the disclosure made in my copending application for patent on water control for closet tanks, Serial No. 431,017; filed Feb. 16, 1942, which issued as Patent No. 2,299,707 on October 20, 1942.

Among the objects of the present invention are:

To provide, for a toilet storage tank and ball cock fixture combination, an improved independent means for preventing back-siphoning of the water in the storage tank through the refill tube or the ball cock valve structure into the main supply line containing the latter; to provide a more compact and more easily made structure for the purpose just stated, and a structure the body portion of which consists only of parts which may be formed as a unitary casting; and to reduce the number and simplify the character of the liquid conducting passages and ports required to carry out the purposes of the invention.

Other objects, advantages and features of invention will hereinafter appear.

Referring to the drawing wherein is shown a preferred embodiment of the invention as now reduced to practice:

Figure 1:
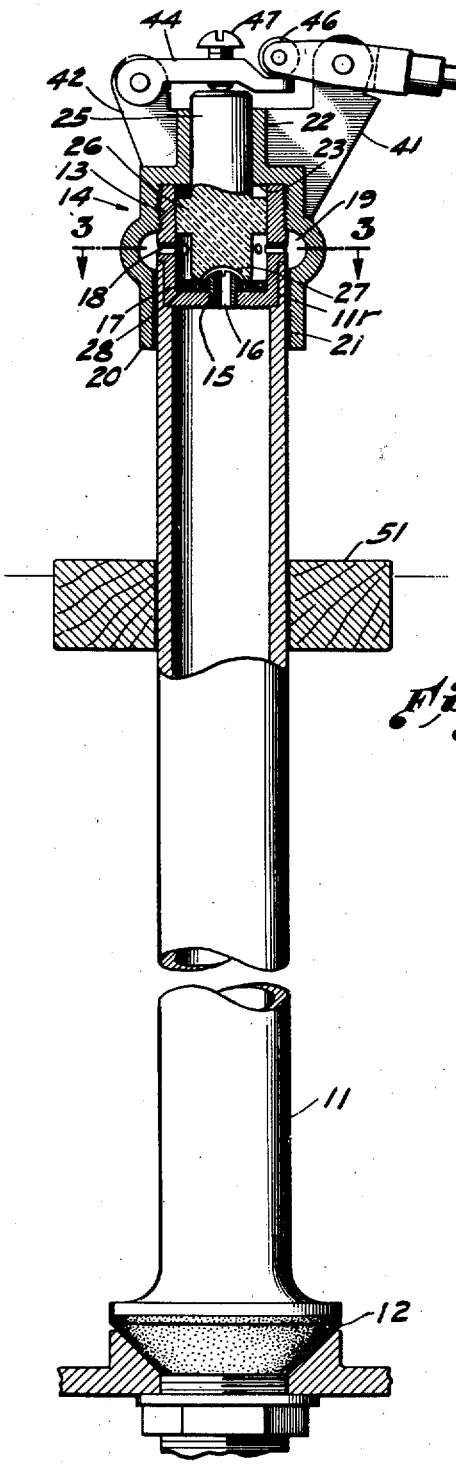
Fig. 1 is a cross section of a toilet tank showing the installed device in a position for flushing.
Figure 2:
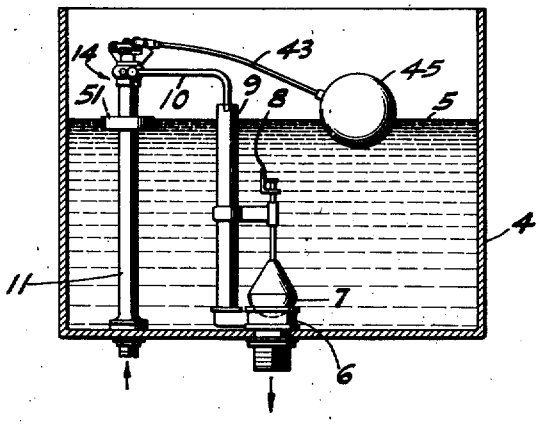
Fig. 2 is an enlarged view partly in side elevation and partly in vertical midsection of the ball cock structure per se shown in Fig. 1, some portions being broken away in order to contract the view.

Referring in detail to the briefly described views, the toilet tank 4 contains a body of water 5 which is discharged through the fixture 6 in a direction indicated by the arrow when the valve 7 is operated by means of a conventional trip lever through the medium of the lift 8 in the well known manner. An overflow pipe 9 connects with the fixture at a lower level than the seat of the valve 7 and into the mouth of said pipe is directed the free end of the refill tube 10, the mouth of said tube being located preferably above the highest level of the body of water in the tank together with the body portion thereof, as will be presently more fully described.

A pressure source of water supply communicates with the tank 4, it being connected to the inlet pipe 11 and the latter pipe sealed with the floor of the tank by means of the gasket washer 12. Into the annular recess 11r located in the discharge end of the pipe 11 is sweated the contracted lower end of the tubular valve cup 13, the outer diameter of said cup above said contraction being the same as that of the pipe 11 and the upper part of said cup being externally screwthreaded and having screwed thereonto the tubular cap structure 14.

The valve cup 13 is provided with a threaded inlet port 15 in the transversely extending bottom portion thereof in axial alinement with the pipe 11 and into said port is screwed a tubular screw 16, by means of which the valve seat gasket washer 17 is secured to the bottom of the cup. In the wall of the cup 13 at a point slightly spaced above its point of sweating onto the pipe 11 is arranged a circumferentially spaced series of radially extending passages 18.

The cap structure 14 at a point adjacent its threaded union with the cup 13 is outwardly bulged thereby providing a semi-circularly shaped, circumferential passageway 19 into which the water discharges from the passages 18 and below said passageway said bulge terminates in a downwardly directed skirt 20 the inner periphery of which is slightly spaced away from the external periphery of the pipe 11 thereby providing an annular channel 21 through which the water flows from the passageway 19 into the tank.

The upper part of the cap structure 14 is diametrically contracted to form an axial tubular extension 22 and also to form a downwardly facing annular shoulder 23 which overhangs the space surrounded by the upper end of the valve cup 13. Within said valve cap is mounted a vertically slidable plunger valve 25, the upper part of which has a working fit within the tubular cap extension 22. The lower portion of the plunger valve 25 which remains within the valve cup 13 during the operation of the device has a diametrically enlarged part 26 which forms an annular extension or broad circumferential rib therearound, this enlarged part having a cylindrical face that has a working fit within the valve cup 13. During the operation of the device the enlarged part 26 always remains above the passages 18.

The lower end of the plunger valve 25 has a central concavity 27 and around said concavity a bevel 28, thus providing a definite circular edge for contacting with the valve washer 17 when the valve closes. The concave recess 27 extends into the end of the plunger a sufficient distance safely to clear the head of the tubular screw 16 when the plunger valve is in the seated position.

At one side, on a level with its annular channel 19, the tubular structure 14 is furnished with a lateral extension 31. A horizontally directed passage 32 extends from the channel 19 into said extension 31, this passage having a contracted outlet port 33 leading laterally from its outer end portion to discharge the water horizontally across an anti-siphoning gap 34 into a larger, horizontal passage 35 with which said outlet 33 is in axial alinement. Said port 33 extends horizontally, that is to say its axis lies in a horizontal plane. With the opposite end of said passage 35 communicates the refill tube 10. The intake portion of said refill tube is in axial alinement with the stream issuing from said contracted outlet 33 and is substantially straight for a sufficient distance from its intake extremity to avoid materially impeding said stream.

The top of the overflow pipe 9 is positioned in the tank at a lower level than the cap structure 14 and therefore the entire cap structure, as well as the intake and delivery ends of the refill tube which leads horizontally therefrom, is maintained at all times above the water level.

The upper part of the tubular cap structure is provided with conventional oppositely disposed extensions 41 and 42 to which are respectively pivoted the float rod 43 and lever 44, the pivoted portions of said rod and lever being bifurcated so as to straddle the upper portions of said two extensions. The rod structure 43 carries a float 45 on one end and at its opposite end has bifurcations between which is pivoted the antifriction roller 46 which normally rests upon the free end of the lever 44. A regulating screw 47, carried by the mid-length portion of said lever 44 has its headed end directed upwardly and its lower end normally resting upon the top of the plunger valve 25.

Around the inlet pipe 11 is loosely fitted a buoyant body 51 which rises and falls with the water level and its upper surface is always in the path of said downward stream. The force of this stream may slightly submerge said body at times. Said buoyant body will always function to cause said downward stream of water to merge in a noiseless manner with the body of water in the tank.

In the operation of the device the toilet tank 4 is flushed in the well known manner, at which time the valve controlling float means 45 drops as the body of water 5 in said tank is emptied through the discharge fitting 6. As the globular float 45 starts to fall the inlet means controlled by the plunger 25 is immediately opened and water from the supply pipe 11 starts flowing through the radial passages 18 into the passageway 19 and through the annular channel 21 into the tank. As the water leaves the annular channel 21 it is directed against the annular buoyant body 51 during the time the tank is emptying, and while the tank is filling the annular float rises, always maintaining a buoyant position, so that the water falling thereagainst will merge with the water in the tank without noise.

Figure 3:
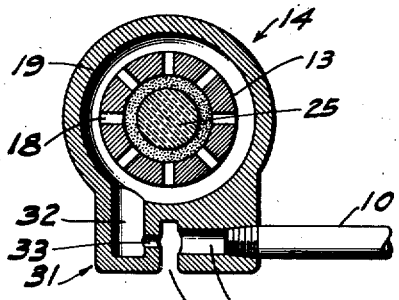
Fig. 3 is a transverse section taken on line 3—3 of Fig. 2, a portion of the refill tube being included in the view.

As a portion of the water flows through the channel 21 into the tank, other parts of the stream are directed through the lateral extension 31 through the reduced passage 33, squirts across the gap 34 into the terminal passage or port 35 and thence passes through the straight portion of the refill tube 10 and finally into the overflow pipe 9 for the purpose of supplying in an economical manner the required amount of water to the conventional toilet trap below the tank. It will be seen that the outer extremity of the passage 32 is closed, and the port 33 communicates laterally with said passage in a slightly inwardly spaced relation to its extremity, the cross section of said port being considerably less than that of the port of the passage from which it leads. As said port 33 alines axially with the larger passage 35, a drill may be inserted through the latter passage to drill the port to the predetermined size desired. The passage sections 32, 33 and 35 combine to form a horizontal L-shaped passage which may be conveniently included within a single casting having the lateral extension shown in Fig. 3 furnished with the vertical groove 34 which forms the required air gap. The air gap 34, at all times isolated from flowing liquid except that issuing from port 33, prevents water at any time from being siphoned through the refill tube into the main supply line. The angular shaped passage 32, 33 and 35 is arranged in such a relation to the casting of which it forms a part, as to require only a short radial casing extension 31 to contain all portions of said three part passage, including the air gap 34 between the passage sections 33 and 35. This structure also makes it possible to use a longer intake portion for the refill tube which bridges the distance between the inlet pipe 11 and the overflow pipe 9.

The operation of the remaining structure, not specifically alluded to, will be readily understood from the preceding detailed description.

It should be understood that the present disclosure is for the purpose of illustration only and that this invention includes all modifications and equivalents which fall within the scope of the subject matter claimed.

What is claimed is:

1. In an anti-siphoning device of the kind described, a casting mountable upon the discharge portion of an upstanding supply pipe for a toilet tank, said casting having a lateral extension, there being an L-shaped horizontally extending passage within said extension of said casting, one limb of said L-shaped passage receiving a portion of the stream delivered from said casting and the other or outer limb thereof having across it an air gap formed by a recess or groove which extends transversely of the extension of the casting wherein the passage is formed, the part of said outer limb which is on the intake side of said air gap being of less diameter and axially in line with the remaining part of said outer limb, and a refill tube in communication with the outer part of said outer limb.

2. In an anti-siphoning device of the kind described, a casting mountable upon the discharge portion of an upstanding supply pipe for a toilet tank above the level of water in said tank, said casting having a lateral extension thereon, an L-shaped horizontally extending passage contained within said extension, one limb of said L-shaped passage receiving a portion of the stream delivered from said casting and the other or outer limb thereof having across it an air gap formed by a recess or groove which extends transversely of the extension wherein the passage is formed and divides the latter limb into an inner section and an outer section, said inner section being axially in line with the outer section, and a refill tube in communication with the outer part of said outer section said air gap constructed and arranged to be at all times isolated from liquid flow except such as issues from the inner section of said divided passage.

3. In an anti-siphoning device, a casting mountable upon the discharge portion of an upstanding supply pipe for a toilet tank above the level of water in said tank, said casting having a lateral extension thereon, a horizontally extending passage contained within said extension, said passage having an inner portion and an outer portion forming a continuation of said inner portion, said inner portion of said passage communicating with the casting for receiving a portion of the liquid delivered therefrom and said outer portion thereof having across it an air gap intermediate its ends, the part of the passage of said outer portion which is on the intake side of said air gap being more restricted in area than the remaining part of said outer portion of said passage, and a refill tube in communication with the end of said outer portion of said passage remote from the air gap, said air gap constructed and arranged to be at all times isolated from liquid flow except such as issues from said more restricted passage.

4. An anti-siphoning device comprising a casing adapted to be mounted upon the vertical intake pipe of a flush tank and having a lateral extension thereon, a horizontally extending passage within said extension, said passage comprising an inner portion and an outer portion extending laterally from said inner portion, said inner portion communicating with the casing for receiving a portion of the liquid delivered therefrom and said outer portion being interrupted by an air gap intermediate its ends whereby said outer portion is divided into an inner section and an outer section, the inner section being restricted in area with respect to the outer section, and a refill tube in communication with the end of said outer section remote from the air gap.

5. The subject matter of claim 4, and the intake portion of said refill tube being in axial alinement with the stream issuing from said restricted inner section, and substantially straight for a sufficient distance from its intake extremity to avoid materially impeding said stream.

BENNETT SVIRSKY.